United States Patent
Nakagawa

[11] 3,926,507
[45] Dec. 16, 1975

[54] TELEPHOTO LENS SYSTEM
[75] Inventor: Jihei Nakagawa, Tokyo, Japan
[73] Assignee: Olympus Optical Company Limited, Tokyo, Japan
[22] Filed: Jan. 30, 1975
[21] Appl. No.: 545,706

[30] Foreign Application Priority Data
Feb. 4, 1974  Japan.................................. 49-14217

[52] U.S. Cl. ................................................ 350/216
[51] Int. Cl.² ...................... G02B 9/60; G02B 13/02
[58] Field of Search ...................................... 350/216

[56] References Cited
UNITED STATES PATENTS
3,749,478  7/1973  Nakagawa et al. ................. 350/216

FOREIGN PATENTS OR APPLICATIONS
466,144  2/1971  Japan.................................. 350/216

*Primary Examiner*—John K. Corbin
*Attorney, Agent, or Firm*—Waters, Schwartz & Nissen

[57] ABSTRACT

A telephoto lens system designed to operate with an image angle on the order of 24° at an aperture ratio F:4.5 and having a telephoto ratio as small as 0.92 and a high degree of correction of various aberrations is disclosed. The telephoto lens system consists of five single air-spaced lenses which are optically aligned with each other in succession from the object side and convex toward the object side, respectively. The first three lenses are positive meniscus lenses, respectively. The fourth lens is a negative meniscus lens and the fifth lens is a positive meniscus lens which is lengthily air-spaced from the fourth lens.

1 Claim, 4 Drawing Figures

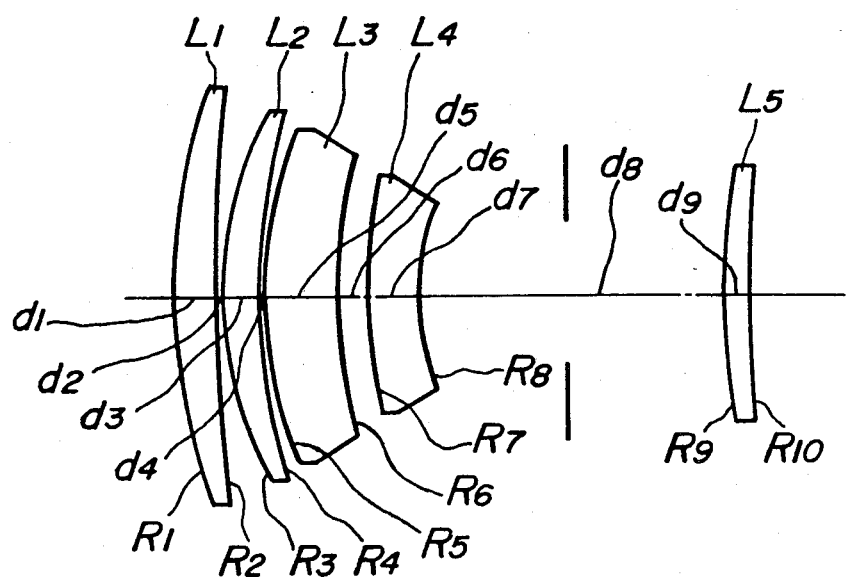

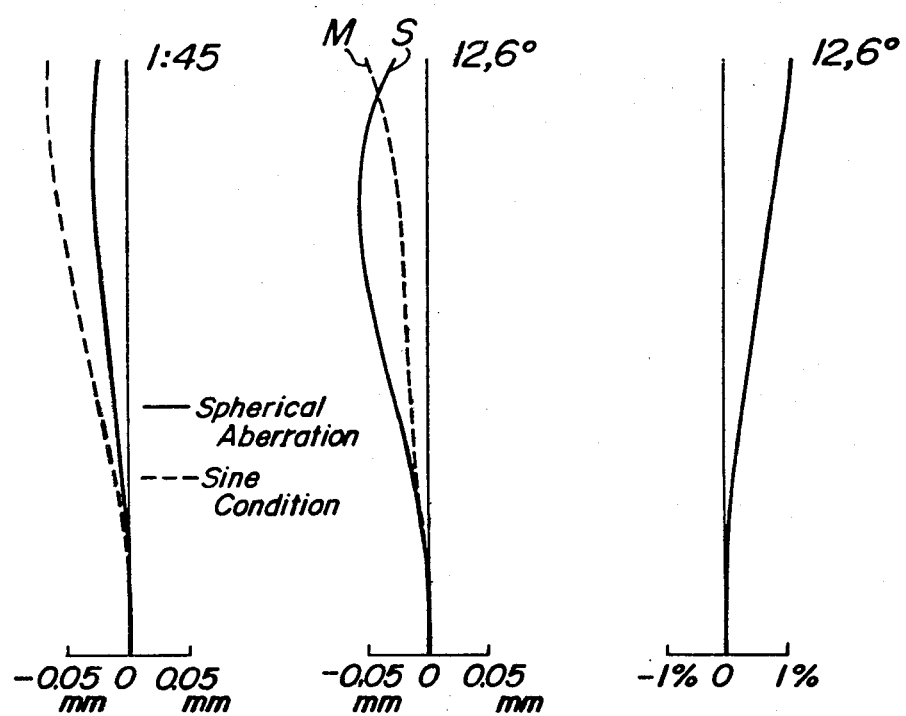

TELEPHOTO LENS SYSTEM

This invention relates to a telephoto lens system designed to operate with an image angle on the order of 24° at an aperture ratio F:4.5 and particularly made available to large size cameras.

In lens system designed for large size cameras, it has been the common practice to imcorporate therein a lens shutter having a relatively large aperture.

As a result, it is required to provide a lengthy air space for the shutter and make a telephoto ratio of the lens system small with substantial suppression of various aberrations.

An object of the invention is to provide a telephoto lens system designed to operate at an aperture ratio of F:4.5 with an image angle on the order of 24° and having a telephoto ratio as small as 0.92 and a high degree of correction of various aberrations.

The invention will now be described in greater detail with reference to the accompanying drawings, wherein:

FIG. 1 is a diagrammatic view of a preferred form of the invention; and

FIG. 2A, 2B and 2C are graphical representations of the spherical aberrations and sine condition, the sagittal and meridional astigmatisms designed by S and M, and the distortions, respectively, and related to the telephoto lens system shown in FIG. 1.

With reference to FIG. 1 of the drawing, the preferred telephoto lens system is of a deformed Ernostar type and comprises a group of single air spaced positive meniscus lenses $L_1$, $L_2$ and $L_3$ located on the front side of the system, the lenses $L_1$, $L_2$ and $L_3$ all being convex toward the object side, spaced rearwardly thereof is a negative meniscus lens $L_4$ which is convex toward the object side and is coaxially aligned between the group of lenses $L_1$, $L_2$ and $L_3$ on the front side and a lengthy air-spaced positive meniscus lens $L_5$ which is convex toward the object side on the rear side. In the space between lenses $L_4$ and $L_5$, a diaphragm is located. In accordance with the inventor's computations and experiments, the best values for the parameters $R_1$ to $R_{10}$ and $d_1$ to $d_9$ of the telephoto lens system shown in FIG. 1, together with the refractive indices $n_1$ to $n_5$ and the Abbe numbers $v_1$ to $v_5$ were determined to be as stated herebelow, the system so defined having an aperture ratio of F:4.5, and an image angle of 24°12' based on an overall focal length of $f = 100$ units (e.g. mm).

Table

| Lens | Radii | | Thicknesses and separations | n | $v$ |
|---|---|---|---|---|---|
| $L_1$ | $R_1$ | 39.42 | | | |
| | | | $d_1$ 4.72 | $n_1$ 1.58913 | $v_1$ 61.1 |
| | $R_2$ | 192.88 | | | |
| | | | $d_2$ 0.42 | | |
| $L_2$ | $R_3$ | 31.58 | | | |
| | | | $d_3$ 3.36 | $n_2$ 1.56873 | $v_2$ 63.1 |
| | $R_4$ | 54.73 | | | |
| | | | $d_4$ 0.25 | | |
| $L_3$ | $R_5$ | 36.24 | | | |
| | | | $d_5$ 6.39 | $n_3$ 1.70154 | $v_3$ 41.1 |
| | $R_6$ | 45.79 | | | |
| | | | $d_6$ 2.61 | | |
| $L_4$ | $R_7$ | 91.23 | | | |
| | | | $d_7$ 3.89 | $n_4$ 1.7847 | $v_4$ 26.2 |
| | $R_8$ | 19.10 | | | |
| | | | $d_8$ 25.78 | | |
| $L_5$ | $R_9$ | 63.30 | | | |
| | | | $d_9$ 2.55 | $n_5$ 1.7847 | $v_5$ 26.2 |
| | $R_{10}$ | 174.15 | | | |

The telephoto lens system designed in accordance the these values listed in the above Table in which the focal distance of the third lens $L_3$ of the group of positive meniscus lenses $L_1$, $L_2$ and $L_3$ is made relatively long and the axial distance from the front surface $R_1$ of the lens $L_1$ to the first front surface $R_7$ of the lens fourth $L_4$ is defined by the value listed in the above Table is capable of making a telephoto ratio as small as 0.92.

In addition, a relatively high refractive index of each of the lenses $L_1$, $L_2$ and $L_3$ as well as a large radius of curvature of each of these lenses insure an excellent correction of spherical aberrations and coma.

A high refractive index of the fourth lens $L_4$ is particularly effective in preventing decrease of Petzval sum and a large radius of curvature of the fourth lens $L_4$ insures an excellent correction of coma. Moreover, a smaller dispersive power of the third lens $L_3$ than those of the first and second lens $L_1$ and $L_2$ corrects the chromatic aberrations.

In FIG. 2A to 2C are graphically shown various aberrations of the telephoto lens system according to the invention. FIG. 2A shows the spherical aberrations in a full line and the sine condition in dash lines.

FIG. 2B shows the sagittal astigmatism designated by S and in a full line and the meridional astigmatism designated by M and in dash lines. FIG. 2C shows the distortion.

What is claimed is:

1. A telephoto lens system which consists of five single air-spaced lenses which are optically aligned with each other in succession from the object side and convex toward the object side, respectively, the first three lenses being positive meniscus lenses, respectively, the fourth lens being a negative meniscus lens and the fifth lens being a positive meniscus lens which is lengthily air-spaced from said fourth lens, and constructed according to the constructional data given herebelow:

$f = 100$, F:4.5

| Lens | Radii | | Thicknesses and separations | n | $v$ |
|---|---|---|---|---|---|
| $L_1$ | $R_1$ | 39.42 | | | |
| | | | $d_1$ 4.72 | $n_1$ 1.58913 | $v_1$ 61.1 |
| | $R_2$ | 192.88 | | | |
| | | | $d_2$ 0.42 | | |
| $L_2$ | $R_3$ | 31.58 | | | |
| | | | $d_3$ 3.36 | $n_2$ 1.56873 | $v_2$ 63.1 |
| | $R_4$ | 54.73 | | | |
| | | | $d_4$ 0.25 | | |
| $L_3$ | $R_5$ | 36.24 | | | |
| | | | $d_5$ 6.39 | $n_3$ 1.70154 | $v_3$ 41.1 |
| | $R_6$ | 45.79 | | | |
| | | | $d_6$ 2.61 | | |
| $L_4$ | $R_7$ | 91.23 | | | |
| | | | $d_7$ 3.89 | $n_4$ 1.7847 | $v_4$ 26.2 |
| | $R_8$ | 19.10 | | | |
| | | | $d_8$ 25.78 | | |
| $L_5$ | $R_9$ | 63.30 | | | |
| | | | $d_9$ 2.55 | $n_5$ 1.7847 | $v_5$ 26.2 |
| | $R_{10}$ | 174.15 | | | | wherein $R_1$ to $R_{10}$ inclusive designate the lens curvatures, $d_1$ to $d_9$ inclusive designate the refractive index and $v_1$ to $v_5$ inclusive designate the Abbe number of said lenses numbering from the object side to the image side of said system.

* * * * *